United States Patent
Gunawardena et al.

(10) Patent No.: US 8,743,822 B2
(45) Date of Patent: *Jun. 3, 2014

(54) DYNAMIC CHANNEL AND TRANSMISSION RATE SELECTION

(71) Applicant: Microsoft Corporation, Redmond, WA (US)

(72) Inventors: Dinan Srilal Gunawardena, Cambridge (GB); Peter Bernard Key, Cambridge (GB); Alexandre Proutiere, Cambridge (GB); Bozidar Radunovic, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,512

(22) Filed: Apr. 15, 2013

(65) Prior Publication Data

US 2013/0223262 A1     Aug. 29, 2013

Related U.S. Application Data

(63) Continuation of application No. 12/793,955, filed on Jun. 4, 2010, now Pat. No. 8,422,444.

(51) Int. Cl.
   *H04W 4/00*     (2009.01)
(52) U.S. Cl.
   USPC ........................................... 370/329

(58) Field of Classification Search
   USPC ........................... 370/328–338, 341, 431, 437
   See application file for complete search history.

(56) References Cited

U.S. PATENT DOCUMENTS

| | | | |
|---|---|---|---|
| 2004/0156353 A1* | 8/2004 | Bevan et al. | 370/351 |
| 2010/0034106 A1* | 2/2010 | Hu et al. | 370/252 |

* cited by examiner

*Primary Examiner* — Frank Duong
(74) *Attorney, Agent, or Firm* — Pablo Tapia; Jim Ross; Micky Minhas (57) ABSTRACT

Dynamic channel and transmission rate selection is described. In an example, a communication resource for transmitting data to a receiver is selected from several channels, each having several associated rates. The selection comprises storing a weighting factor for each channel/rate combination, monitoring transmission performance on a selected channel and rate, and inferring performance for other rates on the selected channel from the monitored performance. Each weighting factor is then updated using the monitored and inferred performances, and used to select a channel/rate combination for subsequent transmission. In another example, a communication device comprises a transmitter, a processor, and a memory arranged to store a weighting factor associated with each receiver, channel and rate combination. The transmitter sends data to a receiver using one channel and rate, and the processor monitors the performance, updates the weighting factors accordingly, and selects a receiver, channel and rate combination for subsequent transmission.

20 Claims, 5 Drawing Sheets

DYNAMIC CHANNEL AND TRANSMISSION RATE SELECTION

RELATED APPLICATION

This application is a continuation of, and claims priority to, U.S. patent application Ser. No. 12/793,955, filed Jun. 4, 2010, and entitled "DYNAMIC CHANNEL AND TRANSMISSION RATE SELECTION." The disclosure of the above-identified application is hereby incorporated by reference in its entirety as if set forth herein in full.

BACKGROUND

Communication networks enable data to be transmitted between a transmitter and a receiver by utilizing a communication resource. In the case of a wireless communication network, the communication resource is a radio frequency that is manipulated using certain modulation and coding schemes to convey the data. As the utilization of the radio spectrum increases, such communication resources become increasingly congested and scarce.

A "white space" spectrum environment enables wireless communication to be performed using unused parts of the radio spectrum. For example, a primary user can have licensed access to a portion of the radio spectrum, but secondary, unlicensed, users may be able to opportunistically use this portion of spectrum at times when the primary user is not utilizing it. Therefore, a white space environment can ease communication resource scarcity. For example, the FCC has allowed parts of the UHF spectrum below 700 MHz to be used for this purpose.

However, the use of white space environments bring their own challenges. Firstly, it can be difficult to detect and avoid channels occupied by primary users, with whom interference is to be avoided. Secondly, white spaces provide a potentially large pool of available frequency channels (including frequency fragments available between primary users). Due to the wide frequency range (for example up to 200 MHz), the qualities of the available channels can vary substantially.

As a result, choosing a communication resource from the white space (in terms of a frequency channel and transmission rate) is difficult. Neither the received signal strength indicator (RSSI) nor signal to noise ratio (SNR) is a good predictor of channel quality. As a result, probing is used to learn the quality of each channel available at each transmission rate. In other words, several packets are transmitted at each channel and at each rate, to construct a reliable estimate of the channel quality.

However, because of the large pool of available frequency channels (the state space) there are a very large number of channel and rate combinations available for use. Therefore, probing each of these combinations is inefficient. For example, if an optimum channel and rate is to be selected by probing all combinations, then by the time they are all probed and the optimum selected, the conditions may have changed and the selected combination may no longer be optimum. A similar situation can occur in the case of a smaller number of combinations, but more rapidly changing channel conditions. This is an exploration (probing) versus exploitation (utilization) trade-off as a result of the large state space. The transmitter aims to exploit the optimum channel and rate to send data, whilst constantly exploring whether the optimum channel and rate has changed. Exploration involves a cost in that had or suboptimal channels and rates may be explored which wastes time and communication resources.

The embodiments described below are not limited to implementations which solve any or all of the disadvantages of known channel and rate selection techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Dynamic channel and transmission rate selection is described. In an example, a communication resource for transmitting data to a receiver is selected from several channels, each having several associated rates. The selection comprises storing a weighting factor for each channel/rate combination, monitoring transmission performance on a selected channel and rate, and inferring performance for other rates on the selected channel from the monitored performance. Each weighting factor is then updated using the monitored and inferred performances, and used to select a channel/rate combination for subsequent transmission. In another example, a communication device comprises a transmitter, a processor, and a memory arranged to store a weighting factor associated with each receiver, channel and rate combination. The transmitter sends data to a receiver using one channel and rate, and the processor monitors the performance, updates the weighting factors accordingly, and selects a receiver, channel and rate combination for subsequent transmission.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a wireless "white space" system, the system described is provided as an example and not a limitation. As those skilled in the art will appreciate, the present examples are suitable for application in a variety of different types of communication systems, which may or may not be wireless. For example, the present examples are suitable for application in any communication system using a number of channels, such as digital subscriber line (DSL).

Figure 1:
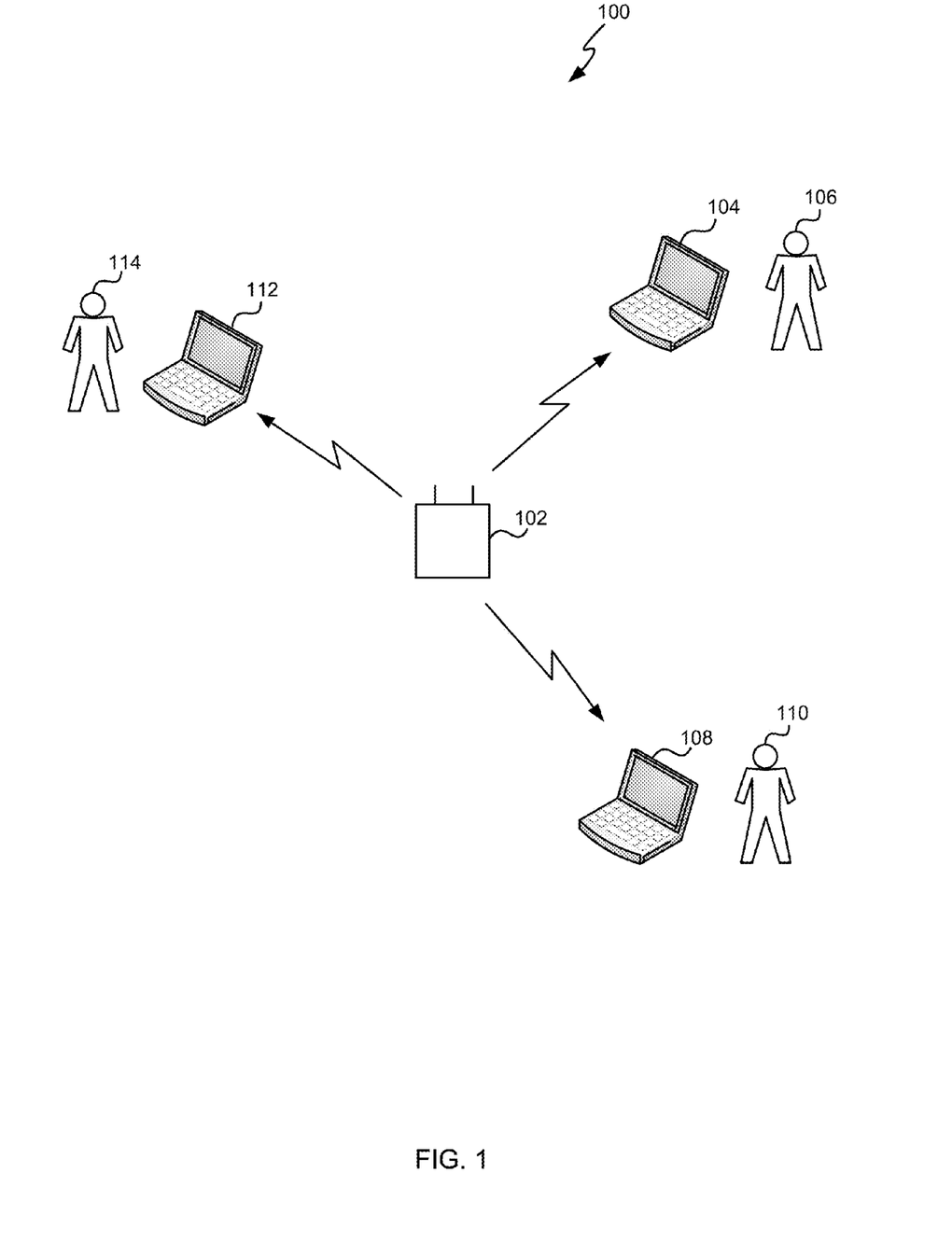
FIG. 1 illustrates a communication system.

FIG. 1 illustrates a communication system 100 in which a dynamic channel and transmission rate selection technique can be utilized. The communication system 100 comprises a communication device 102 such as an access point (AP) which is arranged to transmit data to, and receive data from, one or more nodes.

In the following, the selection of channel and transmission rate for the downlink from the access point to the nodes is considered. Therefore, in such a scenario, the access point is referred to as the transmitter, and the nodes are referred to as receivers. However, it will be understood that the same techniques can also be applied in the uplink direction.

In this example, three receivers are shown receiving data from the access point. A first receiver 104 is operated by a first user 106, a second receiver 108 is operated by a second user 110, and a third receiver 112 is operated by a third user 114. In this example, each of the plurality of receivers are awaiting data from the access point. The access point therefore decides which of the plurality of receivers to send data to, and which available communication resource to use to send the data.

Figure 2:
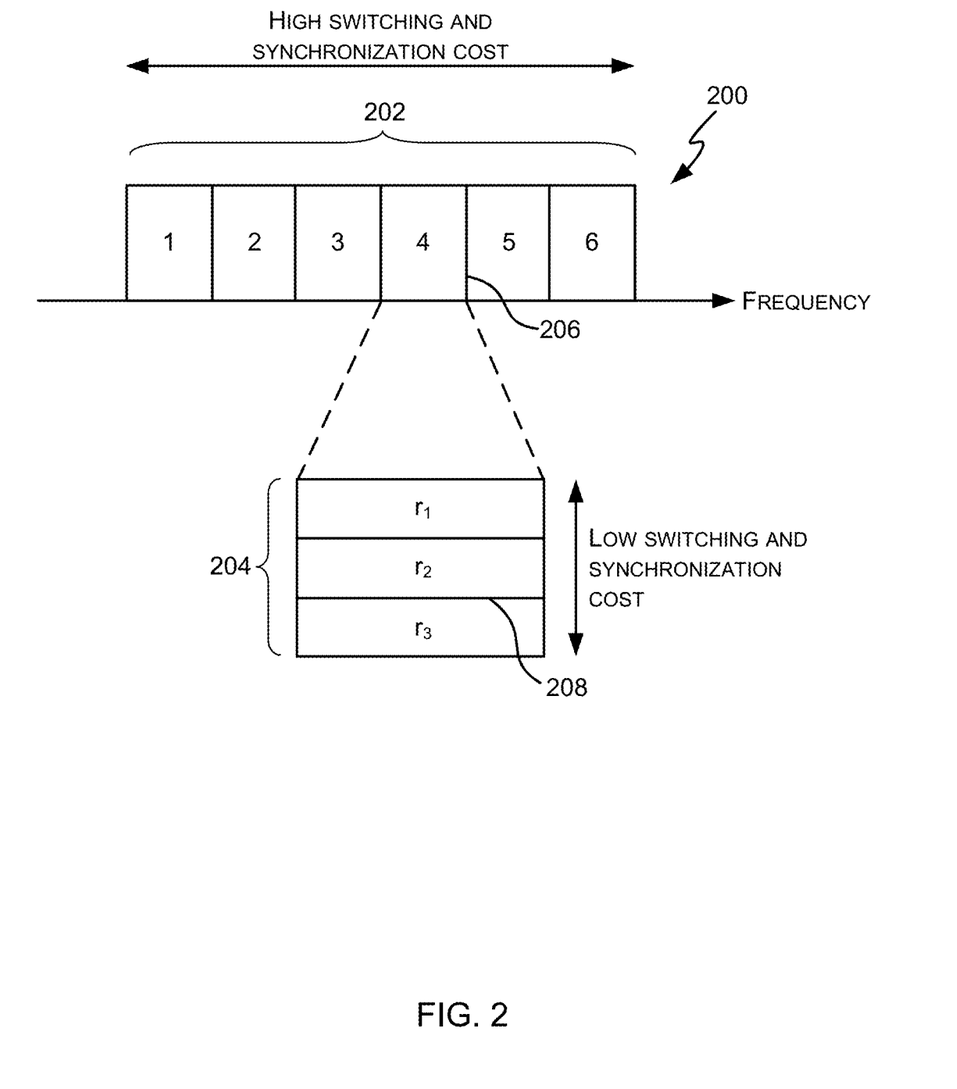
FIG. 2 illustrates a set of communication resources for use in the communication system.

Reference is now made to FIG. 2, which illustrates a schematic diagram of a set of communication resources 200 available for utilization in the communication system 100 of FIG. 1. FIG. 2 shows a plurality of channels 202, which can be frequency channels in the case of a wireless network. In this example, six contiguous frequency channels are illustrated, but in other examples a larger or smaller number of channels may be present, and these do not need to be adjacent to each other in frequency.

Each of the channels 202 can be used to send data at one of a plurality of transmission rates 204. For example, in FIG. 2, a selected channel 206 is illustrated supporting three possible transmission rates $r_1$, $r_2$, and $r_3$. Each of the other channels can also provide data at these transmission rates. The transmission rates can correspond to the selection of certain modulation and coding schemes.

When transmitting data to one of the receivers of FIG. 1, the access point selects a channel and transmission rate combination to use to transmit the data. For example, the access point may select channel 206 and a first transmission rate 208 ($r_2$) to send data to receiver 104 in one example (although this is purely illustrative). Following this transmission of data, if the access point switches to use a different channel (i.e. other than channel 206) then a switching cost is incurred. The switching cost is a temporal cost associated with moving the transmitter frequency and re-synchronizing transmitter and receiver to the new channel. For example, the time taken to move to a new frequency channel can be in the order of 3 ms (although this is implementation dependent). Conversely, switching between transmission rates within a given channel is instantaneous.

Presented herein is a selection technique for enabling the access point to select the receiver, channel and transmission rate to use for a given data transmission. The selection technique considers a number of factors, and selects the optimum receiver, channel, rate combination efficiently and without excessive probing.

The selection technique is adapted to non-stationary environments, which means that it can adapt to time-varying channel quality conditions. The selection technique also explicitly accounts for channel switching and synchronization costs outlined above. Additionally, the selection technique comprises a scheduler function that accounts for fairness issues in network scenarios where several receivers are served by the access point. The selection technique can be implemented efficiently with no signalling packets and minimal MAC overhead, and considers synchronization.

Furthermore, the selection technique utilizes knowledge of correlations that exist between throughputs obtained on the same channel at different rates to reduce the number of channel, transmission rate combinations, and hence reduce the state space that is explored. This enables more effective selections to be made, without requiring increased probing.

The correlations that exist between throughputs obtained on the same channel at different rates are utilized as follows. For a given frequency, the success of a channel transmission depends on two factors: the radio environment and the coding rate. For a given radio environment, the performance at different rates are correlated, and this correlation is exploited by inferring information about the success of a packet transmission at one rate given that the actual transmission was at a different rate (for the same frequency channel).

In general, there is a clear ordering between rates, in that lower rates have higher success probability. This can be combined with the correlation knowledge to give the following properties: (i) if a data packet is received successfully at a given rate on a given channel, the it would have been successful had it been transmitted at a lower rate on the given channel; (ii) if a packet transmission fails at a given rate, then it would have failed had it been transmitted at a higher rate on the given channel. These properties are used to reduce the state space, and hence reduce the amount of probing, as described in more detail hereinafter.

Figure 3:
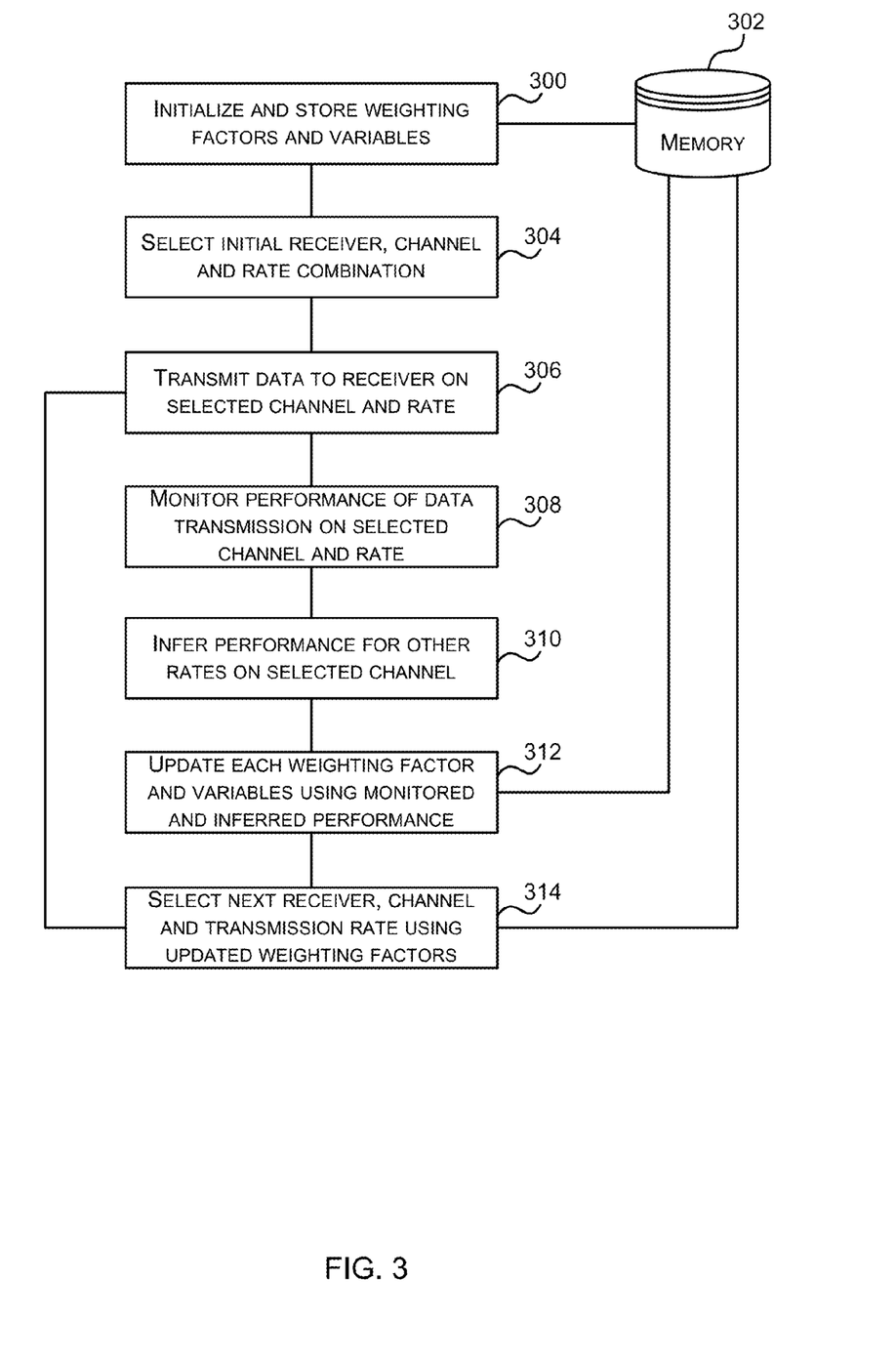
FIG. 3 illustrates a flowchart of a process for dynamically selecting a receiver, channel and transmission rate in the communication system.

Before describing the selection technique in more detail with reference to FIG. 3, some terminology is established for formalizing the system. Firstly, a single transmitter-receiver pair is considered. Transmissions can be carried on C different channels at L different rates $r_1 < \ldots < r_L$ depending on the chosen modulation and coding rate. Channel and rate selection is made periodically, at the beginning of every frame. In this illustrative example, frames have unit duration. The way that this duration is set not important provided it remains small compared to the channel coherence time. If the transmitter decides to switch from one channel to another, it has to wait for a constant switching time s (expressed in frames) before sending any data. This is the switching cost described above. Then data packets are sent at the selected rate for the entire duration of the frame.

A channel and rate selection policy $\pi$ is defined as a sequence of decisions $\pi = (\pi_t \epsilon \{1, \ldots, C\} \times \{1, \ldots, L\}, t \epsilon;)$, where $\pi_t = (i,l)$ if for the t-th frame, channel i and rate $r_l$ are selected. The decisions are based on past observations. Under $\pi$, the channel selected for the t-th frame is denoted by $i_t^\pi$ and the rate selected for the t-th frame is denoted by $l_t^\pi$ (or more precisely $r_{l_t^\pi}$). The "reward" $x^\pi(t)$ received in frame t under policy $\pi$ is defined as the number of bits successfully transmitted during the frame. Rewards are random variables that depend on the packet transmission successes or failures (and in this context represent the amount of data transmitted per channel use, as discussed later).

If at time t, $\pi$ selects channel i and rate l, then the reward at time t is denoted $x_{i,l}(t) = x^\pi(t)$. The average reward under policy $\pi$ up to frame T is given by:

$$R^{\pi}(T) = \frac{1}{T} \sum_{t=0}^{T-1} x^{\pi}(t)$$

The success rate of a transmission on a given channel and at a given rate can evolve quite arbitrarily in time, and it can be difficult in practice to develop a statistical model for this evolution. Instead the following model for the non-stationary evolution of success rates is used. The success rate of a packet transmission in frame t on channel i and at rate $r_l$ denoted $\mu_{i,l}(t)$. The success rate process is denoted by $\mu(\cdot)=(\mu_{i,l}(\cdot),i,l)$. If policy $\pi$ selects channel i and rate l in frame t>0, the expected reward achieved during this frame depends on whether or not channels are switched, as given by:

$$E_\mu[x^\pi(t)]=(1-s1_{i_{t-1}\neq i_t})x_{i,l}(t)$$

Where $2_\mu[\cdot]$ denotes the expectation under success rate process $\mu$, and where the reward $x_{i,l}(t)$ is equal to $r_l \cdot \mu_{i,l}(t)$. In other words, the expectation is $x_{i,l}(t)$ if there is no switching (i.e. the channel stays the same between frames such that $i_{t-l}=i_t$). If there is channel switching (such that $i_{t-l}\neq i_t$) then the switching time s reduces frame duration during which bits can be successfully sent. Note that $E_\mu[x^\pi(0)]=r_l\mu_{i,l}(0)$ as there is no initial switching cost.

The above gives rise to the following property: the reward during a frame of any policy selecting rate l is upper bounded by $r_l$. This property is used in the design of the efficient rate selection scheme described below. The channel and rate selection policy aims to track the optimum channel and rate in terms of expected reward. If the evolutions of success rates $\mu_{i,l}(t)$ were completely arbitrary, this task would be difficult. However, in real-life systems, the optimum channel and rate choice do not change very often. The channel and rate selection schemes described below offer good performance guarantees when the optimum channel and rate change at a relatively low rate, defines as less than $\alpha$ per frame.

More precisely, if $(i^*_t, l^*_t)$ is the decision of channel and rate offering maximum expected reward in frame t without accounting for possible switching cost, then:

$$(i^*_t, l^*_t) = \underset{(j,k)}{\operatorname{argmax}} r_k \mu_{j,k}(t)$$

In other words, the decision offering maximum expected reward is the combination of channel and rate maximising the product of the rate and the success rate. The optimum channel and rate change at a rate less than $\alpha$, it for any time horizon T, $$\sum_{t=1}^{T} 1_{(i^*_t, l^*_t)\neq (i^*_{t-1}, l^*_t)} \leq \alpha T$$

The set of success rate processes $\mu(\cdot)$ satisfying this equation is denoted $M_\alpha$. As stated, the aim of the policy is to track the optimum channel and rate for transmission. A practical policy can be compared to an "ideal" policy that tracks the optimum channel and rate without accounting for the switching cost. Such an ideal policy yields an expected average reward $R^*(T,\mu)$ up to time T equal to:

$$R^*(T, \mu) = \frac{1}{T} \sum_{t=0}^{T-1} r_{l^*_t} \mu_{i^*_t l^*_t}(t)$$

The notion of "regret" (as known in the art) can be used to evaluate the performance of a policy $\pi$:

$$regret^\pi(t) = \max_{\mu \in M_\alpha} \{R^*(T, \mu) - E_\mu[R^\pi(T)]\}$$

Note that the regret is an abstract notion defined with respect to the worse success rate process $\mu \in M_\alpha$ among all possible success rate processes (channel descriptions) for which the optimum channel and rate change at a rate at most $\alpha$. In the following, policies $\pi$ are derived whose regret is bounded by some function $g(\alpha)$, where $g(\alpha)$ tends to 0 as $\alpha \rightarrow 0$. Such algorithms achieve a long-term expected throughput $\lim \inf_{t\rightarrow\infty} E_\mu[R^\pi(T)]$ at least equal to $\lim_{T\rightarrow\infty} R^*[T]-g(\alpha)$, and hence a throughput very close to that of the ideal policy continuously tracking the optimum channel and rate.

The design of channel and rate selection schemes can be viewed as an extension of multi-arm bandit (MAB) problems. Each (channel, rate) tuple is interpreted as an "arm", with rewards having distributions with time-varying means. In a MAB problem a gambler pulls at each time t $\epsilon$; an arm among K arms. Each arm i generates independent and identically distributed rewards with distribution of mean $\beta_i$, independent of the rewards generated by pulling other arms. The reward distributions are not known initially by the gambler, and have to be learnt. The goal is to design an algorithm minimizing the learning cost often expressed as the expected regret over T rounds, defined as the difference between the total expected average reward obtained by always choosing the optimum arm and the total average reward obtained by using the algorithm.

However, in the MAB problem above, the distributions of rewards do not evolve in time. In the case of a channel and rate selection scheme, the channel environment in non-stationary, and hence the distributions of rewards change over time. Non-stationary MAB problem algorithms are known, but they offer poor performance in practice for a channel and rate selection problem. This is due to the fact that the number $K=C\times L$ of possible decisions at each step is typically large (i.e. a large number of arms in the MAB problem). As a consequence, the upper confidence bound used for the algorithm updates, although asymptotically optimal, does not have time to decrease before the environment changes. In other words, the algorithm does not have sufficient time to learn the statistical properties of all arms.

Reference is now made to FIG. 3, which illustrates a flowchart of a process for dynamically selecting a receiver, channel and transmission rate in a communication system such as that shown in FIG. 1. First, FIG. 3 is discussed in the context of a single link scenario, where only a single transmitter-receiver pair is present. In other words, only the channel and rate are selected by the transmitter, and the receiver to which data is to be transmitted does not need to be selected. Scenarios involving multiple receivers are discussed later.

The process shown in FIG. 3 utilizes knowledge of the switching cost and correlations between rates (as described above) to ensure that the scheme has time to learn the properties of the channel environment before it changes. For a channel i and rate l, the expected reward at frame t depends on whether switching of a channel is performed. In addition "side-information" about the rewards generated by selecting channel i and rate l is known. It is known in advance that the reward when selecting rate l is bounded by $r_l$, and that the rewards obtained by selecting the same channel i but different rates are correlated. If a transmission fails at rate $r_l$, it would also fail at higher rate, and, reciprocally, if a transmission at rate $r_l$ is successful, then it would also be successful at tower rates.

In the first block of FIG. 3, weighting factors and variables are initialized 300 for each combination of channel and rate. Therefore, K=C×L weighting factors are created and initialized, and similarly K sets of variables are created and initialized. The initialized weighting factors and variables are stored in a memory 302. The weighting factors are changed over time, and the weighting factor for channel i and rate l at time t is denoted herein as $w_{i,l}(t)$. The initial value is therefore $w_{i,l}(0)$.

In an example, the weighting factor for channel i and rate l is initialized to the value of the rate, i.e., $w_{i,l}(0)=r_l$. The reason for this is as follows: compared to traditional MAB problems, additional information is known in this scenario—a strict upper bound of the reward obtained by selecting a given rate (as noted in the property hereinabove). This enables a reduction in the space of exploration. For example, if selecting channel i and rate $r_l$ has proven to generate an average reward greater than $r_k$ for k<l, then it is pointless to explore rate $r_k$ even if the latter has not been selected at all. This is because it is known that rate $r_k$ cannot generate a reward as high as that achieved on rate $r_l$. This contrasts with traditional MAB where exploring all arms (here all tuples (channel, rate)) is performed. To utilize this side information, the weighting factors for rate $r_l$ are initialized to $r_l$, and these weighting factors are upper bounded by $r_l$ (see below for weighting factor update explanation). Initializing the weighting factor to the rate ensures that higher rates are explored first, and lower rates are only used when needed.

Several variables are also maintained for each combination of channel and rate. These are: the empirical discounted number of times channel i and rate l have been selected, denoted $\hat{n}_{i,l}(t)$; the empirical discounted reward for each tuple (i, l), denoted $\hat{x}_{i,l}(t)$; and the number of times before the beginning of frame t that channel i was successively selected, denoted $m_i(t)$. The equations for updating these variables are described hereinafter. To initialize these variables, they can be set to zero.

Next, the initial selection 304 of receiver, channel and rate is made. In this example, only a single transmitter-receiver pair is being considered, so no selection of receiver is performed. The selection of channel and transmission rate is based on a consideration of the weighting factors. For example, the transmitter can compare each of the weighting factors, and select the channel and rate combination that has the maximum value for the weighting factor. In other words, the channel/rate combination $(i_t, l_t)$ for time t is given by:

$$(i_t, l_t) = \underset{(j,k)}{\operatorname{argmax}} w_{j,k}(t)$$

In the case that several channel/rate combinations have the same weighting factor (as is often the case for the initial selection 304), then a random, arbitrary selection can be made between those channel/rate combinations having the same weighting factor. In other examples, any other suitable method of breaking ties can be used.

The data is then transmitted 306 from the transmitter to the receiver using the selected channel and transmission rate. The data can be in the form of data packets that are transmitted for the duration of the frame on this channel and at this rate.

The performance of the transmission of the data on the selected channel and transmission rate is monitored 308. For example, the reward $x_{i_t,l_t}(t)$ (the number of bits successfully transmitted—or successfully received—on the selected channel and transmission rate during the frame) can be monitored and recorded by the transmitter.

Next, an inferred performance for the other rates on the selected channel is generated 310 using the monitored performance. In other words, using the monitored reward for a given rate on a certain channel, an inferred reward is generated for each of the other available rates on that channel. The inference of performance at other rates can be performed using "soft sampling", as now described.

Soft sampling is based on the knowledge that the rewards at different rates achieved on the same channel are correlated, in order to exploit these correlations, a model is used as follows. It is assumed that the successes of a transmission at various rates on channel i at a given time t are all correlated through a random variable $U_i$, uniformly distributed on [0,1]. This variable may, for example, characterize the link SNR on channel i. The transmission is successful at rate l if and only if $U_i \leq \mu_{i,l}(t)$. Under this model, an observed successful transmission or failure at rate $r_l$ provides some information about the probability the transmission at other rates would have been successful.

The model is used to infer performance as follows. Following the observation of the reward $x_{i,l}(t)$ of the transmission on channel i at rate $r_l$ in frame t, then:

if the transmission was successful, i.e. $x_{i,l}(t)=r_l$, then it is inferred that the reward $x_{i,k}(t)$ when transmitting at rate $r_k$ would have been:

$$x_{i,k}(t) = \begin{cases} r_k, & \text{with probability } 1 \wedge \frac{\mu_{i,k}(t)}{\mu_{i,l}(t)}, \\ 0, & \text{with probability } 1 - \left(1 \wedge \frac{\mu_{i,k}(t)}{\mu_{i,l}(t)}\right) \end{cases}$$

Where $a \wedge b$ means the minimum value of a and b.

If the transmission failed, i.e. $x_{i,l}(t)=0$, then it is inferred that the reward $x_{i,k}(t)$ when transmitting at rate $r_k$ would have been:

$$x_{i,k}(t) = \begin{cases} 0, & \text{with probability } 1 \wedge \frac{(1-\mu_{i,k}(t))}{(1-\mu_{i,l}(t))}, \\ r_k, & \text{with probability } 1 - \left(1 \wedge \frac{(1-\mu_{i,k}(t))}{(1-\mu_{i,l}(t))}\right) \end{cases}$$

Therefore, these two probability distributions are based on the relative transmission success rate between the inferred transmission rate $r_k$ and the monitored transmission rate $r_l$. These two probability distributions can be used to randomly generate soft samples of fictitious (inferred) transmissions at all the other rates for a given channel, i.e. generate rewards $x_{i,k}(t)$ for all $k \neq l$.

The quality of a random soft-sample depends on its variance. For example, if $x_{i,l}(t)=r_l$ and $\mu_{i,k}(t) > \mu_{i,l}(t)$ (i.e. $r_k \leq r_l$), then with probability 1, the soft-sample corresponding to a fictitious transmission at rate $r_k$ yields reward $r_k$, and the soft-sample is completely reliable. In other words, if the monitored performance of the data transmission indicates that the transmission was successful, then it can be inferred that the transmission would also be successful at each of the other transmission rates that are less than the monitored transmission rate. Similarly, if the performance of the data transmission indicates that the transmission was unsuccessful, then it can be inferred that the transmission would also be unsuccessful at each of the other transmission rates that are greater than the first transmission rate.

More generally, the quality $\beta_{l,k}{}^i(t)$ of a soft-sample on channel i at rate $r_k$ in case of a transmission at rate $r_l$ is defined by:

$$\beta_{l,k}^i(t) = \begin{cases} 1 \wedge \dfrac{\mu_{i,k}(t)}{\mu_{i,l}(t)}, & \text{if } x_{i,l}(t) = r_l \\ 1 \wedge \dfrac{(1-\mu_{i,k}(t))}{(1-\mu_{i,l}(t))}, & \text{if } x_{i,l}(t) = 0 \end{cases}$$

By definition $\beta_{l,l}{}^i(t)=1$. Note that the success probabilities $\mu_{i,k}(t)$ are not known exactly. However, these can be replaced by estimators, given by:

$$\mu_{i,k}(t) = \frac{\hat{x}_{i,k}(t)}{r_l \cdot \hat{n}_{i,k}(t)}$$

Therefore, generating an inferred performance through the use of soft-sampling enables the use of a selection scheme as if all rates were sampled at each frame. Thus, with soft-sampling, the number of possible decisions at each frame is reduced from K=C×L to C, i.e. just the number of channels, which improves the performance of the algorithms.

Referring again to FIG. 3, once the inferred rewards (soft samples) for the other rates have been randomly generated and the quality $\beta_{l,k}{}^i(t)$ of the soft-samples has been calculated, then the weighting factors and variables can be updated 312 for each channel/rate combination in accordance with the monitored and inferred performance.

The variable $\hat{n}_{i,l}(t)$ defining the empirical discounted number of times channel i and rate l have been selected is updated recursively as:

$$\hat{n}_{i,l}(t+1) = \gamma \hat{n}_{i,l}(t) + \sum_k \beta_{k,l}^i(t) 1_{(i_t,l_t)=(i,k)}$$

Where $\gamma$ is a discount factor between zero and one, which causes the influence of previous values to decay over time, such that greater weight is given to more recent estimates. The term $$\sum_k \beta_{k,l}^i(t) 1_{(i_t,l_t)=(i,k)}$$

simply adds one to $\hat{n}_{i,l}(t)$ in the case that channel i and rate l was monitored (i.e. not soft-sampled) because $\beta_{l,l}{}^i(t)=1$. In the case that channel i and rate l was soft-sampled, then the value of the soft-sample quality is added to $\hat{n}_{i,l}(t)$.

The variable $\hat{x}_{i,l}(t)$ defining the empirical discounted reward for each channel i and rate l combination (i, l) is updated recursively as:

$$\hat{x}_{i,l}(t+1) = \gamma \hat{x}_{i,l}(t) + x_{i,l}(t) \sum_k \beta_{k,l}^i(t) 1_{(i_t,l_t)=(i,k)}$$

Again, the discount factor $\gamma$ ensures greater weight is given to more recent estimates. The term $$x_{i,l}(t) \sum_k \beta_{k,l}^i(t) 1_{(i_t,l_t)=(i,k)}$$

simply adds the monitored reward $x_{i,l}(t)$ in the case that channel i and rate l was monitored (i.e. not soft-sampled) because $\beta_{l,l}{}^i(t)=1$. In the case that channel i and rate l was soft-sampled, then the soft-sampled reward is multiplied by the value of the soft-sample quality and added to $\hat{x}_{i,l}(t)$.

The variable $m_i(t)$ defining the number of times before the beginning of frame t that channel i was successively selected is updated as:

$$m_i(t) = \max\{u : i_t = \ldots = i_{t-u+1} = i\}$$

Once the variables have been updated, then they can be stored in the memory 302. Note that it is sufficient to only store the most recent values of the three types of variables.

The weighting factors for each channel/rate combination can then be updated for the following frame as follows:

$$w_{j,k}(t+1) = r_k \wedge \left[ \frac{\hat{x}_{j,k}(t+1)}{\hat{n}_{j,k}(t+1)} + r_L \sqrt{\frac{\xi \log\left(\sum_{j',k'}^t \hat{n}_{j',k'}(t+1)\right)}{r_k \hat{n}_{j,k}(t+1)}} \right] + \frac{a 1_{j=i_t}}{m_j(t+1)}$$

The weighting factor is based on several sub-factors, each of which is now considered in turn. The term $\hat{x}_{j,k}(t+1)/\hat{n}_{j,k}(t+1)$ represents a quality factor for the channel j and rate $r_k$, which is given by the average estimated goodput (or throughput) value. Note that this is weighted average due to the discount factor $\gamma$ which applies greater weight to more recent values.

The term $$\sqrt{\xi \log\left(\sum_{j',k'}^t \hat{n}_{j',k'}(t+1)\right) / r_k \hat{n}_{j,k}(t+1)}$$

represents a channel exploration factor. The symbols j' and k' represent the channels and rates other than j and k. $\xi$ is a positive constant. The channel exploration factor is arranged to decrease when the channel j associated with the respective weighting factor is used for data transmission and increase when the channel j is not used for data transmission (recall that $\hat{n}_{j,k}(t)$ decreases over time due to the discount factor $\gamma$). Therefore, a previously unused channel has a higher weighting factor and is more likely to be selected. The exploration factor forces the selection scheme to periodically probe other channels. It is the choice of the exploration term, and the associated parameters, that strikes the balance between exploration and exploitation.

Note that the quality factor and the exploration factor are summed, but upper bounded by $r_k$ due to the $\wedge$ operator. This ensures that higher rates are explored first, as mentioned above.

The final term, $a1_{j=i_t}/m_j(t+1)$ is a channel switching cost factor, which considers the temporal cost associated with changing channels. a is a positive constant. The channel switching cost factor modifies the weights of channel j and rate $r_k$ by adding a positive term in the weight if the channel j corresponds to (i.e., matches) the channel just previously selected and used for transmission. The channel switching cost factor is arranged to tend towards zero as the number of times a channel is successively selected increases, such that when a channel has been successively selected over period of time, the affect of the switching cost factor on the weighting factor decreases. The channel switching cost factor can be arranged such that after a predefined period of time, the affect on the weighting factor is no longer significant.

Returning again to FIG. 3, once the weighting factors have been updated 312, then the channel and rate for the next frame can be selected 314 in dependence on the updated weighting factors. As above, the transmitter can compare each of the weighting factors, and select the channel and rate combination that has the maximum value for the weighting factor. In other words, the channel/rate combination $(i_t, l_t)$ for time t is given by arg max $$\underset{(j,k)}{\arg\max} w_{j,k}(t).$$

The newly selected channel and rate can then be used for transmission, and the process of FIG. 3 repeats. In summary, the above-described channel and rate selection scheme takes into account several factors when selecting the channel and rate: it modifies the weight of the channel just previously selected to avoid the algorithm switching channels too often; it upper-bounds the rewards achieved on rate l by $r_l$ to explore higher rates first; it balances exploration vs. exploitation; and it uses soft sampling to reduce the dimension of the set of possible decisions.

The above-described selection scheme can also be extended to a network scenario (such as that shown in FIG. 1) where an access point is serving N backlogged receivers indexed by u=1, . . . N. As in traditional wireless cellular systems, an efficiency vs. fairness trade-off is faced: it is likely that there is a receiver (close to the AP) that can be served at the highest rate. If the AP always serves this receiver, it achieves the maximum system throughput (efficiency), however at the expense of degrading fairness (the other receivers are not served at all).

To balance fairness and efficiency, the notion of "utility" is employed. Let U be an increasing and concave function. The objective is now to design a learning and scheduling algorithm that maximizes the social welfare:

$$\sum_u U(\phi_u),$$

where $\phi_u$ denotes the long-term service rate (throughput) for receiver u. In some examples, U=log. In an example, the social welfare can be maximized in the long run by using a gradient algorithm in which at time t the discounted throughput for receiver u is defined as:

$$\phi_u(t) = \frac{1-\gamma'}{1-\gamma'^{t+1}} \sum_{s=0}^{t} \gamma'^{t-s} \sum_{i,l} x_{u,i,l}(s) 1_{(u_s,i_s,l_s)=(u,i,l)}$$

Where $\gamma'$ is a fairness factor between zero and one (which can be different to the above discount factor $\gamma$) and $x_{u,i,l}$ is the reward for receiver u on channel i and rate l. $\gamma'$ controls the fairness vs. efficiency trade-off: for $\gamma'$ close to 0, the algorithm greedily picks the receiver that can be served at the optimum rate without accounting for fairness. This is because a low $\gamma'$ results in a discounted throughput that weights recent reward values heavily, and primarily considers this when selecting a receiver. Conversely, when $\gamma'$ is close to 1, the algorithm becomes very fair. This is because $\phi_u(t)$ tends to the historical average throughput for the receiver as $\gamma'$ tends to 1, and the algorithm therefore considers long term fairness.

Note that $\phi_u(t)$ can also be updated in a recursive manner. A gradient algorithm selects at time t the receiver, channel and rate that maximizes the product of the achieved instantaneous rate and $U'(\phi_u(t))$, as outlined in more detail below.

A selection scheme that includes the fairness component of the gradient algorithm above is now described, again with reference to FIG. 3. The algorithm is similar to that described above, except that at each frame, the algorithm has to select a receiver, a channel and a rate. Furthermore, note that due to the broadcast nature of the system, each data packet that is transmitted is heard by all receivers. This property is utilized to assist in the learning process.

Firstly, the variables and weighting factors are initialized 300 and stored. The algorithm maintains similar variables to those discussed above, but extended to the multi receiver scenario. Variable $\hat{x}_{u,i,l}(t)$ is the empirical reward for receiver u when served on channel i at rate l, and is maintained in a similar manner to that described above, except separately for each receiver u. Variable $\hat{n}_{u,i,l}(t)$ is the empirical discounted number of times receiver u, channel i and rate l has been selected. Variable $m_i(t)$ remains the same as described above. The weighting factor for each combination of receiver u, channel i and rate l is denoted $w_{u,i,l}(t)$.

As above, the weighting factors are initialized to the corresponding rate, i.e. $w_{u,i,l}(0)=r_l$. Similarly, $\hat{n}_{u,i,l}(0)=0$, $\hat{x}_{u,i,l}(0)=0$ and $\phi_u(0)=0$ for all receivers at initialization. The initial selection 304 of the combination of receiver, channel and rate is made based on a consideration of the weighting factors. For example, the transmitter can compare each of the weighting factors, and select the channel and rate combination that has the maximum value for the weighting factor. In other words, the receiver/channel/rate combination $(u_t, i_t, l_t)$ for time t is given by:

$$(u_t, i_t, l_t) = \underset{(u,j,k)}{\arg\max} w_{u,j,k}(t)$$

In the case that several receiver/channel/rate combinations have the same weighting factor (as is often the case for the initial selection 304), then a random, arbitrary selection can be made between those channel/rate combinations having the same weighting factor.

The data is then transmitted 306 from the transmitter to the selected receiver using the channel and transmission rate, which can be in the form of data packets that are transmitted to the receiver for the duration of the frame on this channel and at this rate. The performance of the transmission of the data to the selected receiver on the selected channel and transmission rate is monitored 308. However, when a packet is sent to receiver $u_t$, it is overheard by all other receivers, due to the broadcast nature of the system. Receiver $u_t$ can directly observe the reward obtained $x_{u_t,i_t,l_t}(t)$. In addition, since all receivers listen to the transmission, they can also observe the reward $x_{u,i_t,l_t}(t)$ i.e. the reward as if the packet had been intended for that receiver.

Optionally, the performance at the other rates for channel used for transmission can be inferred, as described above, in order to reduce the size of the decision space. In other words, the soft-samples and qualities can be calculated as above.

The weighting factors and variables can then be updated 312 for each receiver/channel/rate combination. The variables $\hat{n}_{u,i,l}(t)$, $\hat{x}_{u,i,l}(t)$, and $m_i(t)$ are updated for all receivers in the same manner as that described above for the single-link example. In addition, $\phi_u(t)$ is updated using the equation above for all receivers using the observed rewards (including the rewards found from overheard data packets).

The weighting factors are updated as follows:

$$w_{u,j,k}(t+1) = U'(\phi_u(t+1))$$

$$\left[r_k \wedge \left[\frac{\hat{x}_{u,j,k}(t+1)}{\hat{n}_{u,j,k}(t+1)} + r_L \sqrt{\frac{\xi \log\left(\sum_{u',j',k'}^{t} \hat{n}_{u',j',k'}(t+1)\right)}{r_k \hat{n}_{u,j,k}(t+1)}}\right] + \frac{a1_{j=i_t}}{m_j(t+1)}\right]$$

In this equation, the first term $U'(\phi_u(t+1))$ represents the utility as described above, and the remainder of the equation (which is similar to that described hereinbefore for the single-link case) represents the achieved instantaneous rate for the purposes of the gradient algorithm.

Once the weighting factors have been updated 312, then the receiver, channel and rate for the next frame can be selected 314 using the updated weighting factors. As above, the transmitter can compare each of the weighting factors, and select the channel and rate combination that has the maximum value for the weighting factor. In other words, the receiver/channel/rate combination $(u_t, i_t, l_t)$ for time t is given by $$\underset{(u,j,k)}{\arg\max}\, w_{u,j,k}(t).$$

The newly selected channel and rate can then be used for transmission, and the process of FIG. 3 repeated.

The above-described scheme therefore enables a selection to be made between receivers, channels and rates, which balances fairness for the receivers, whilst also taking into account switching cost, exploration, and can utilize inferred soft-samples.

Next is considered the implementation of the above-described schemes in a real-time distributed platform. The schemes can be implemented at the MAC layer, and are fast enough to make decisions at packet level and do not need extra signaling packets and have minimum additional header overhead. The schemes can be arranged to aggressively maintain synchronization among nodes skipping channels, as any loss of synchronization between nodes can incur a costly discovery procedure that can deteriorate the performance.

In a system such as that shown in FIG. 1, the AP learns about channel quality from feedback from the receivers. Each unicast packet expects an acknowledgment and if it is missing, it is counted as packet loss. Hence the AP has a very reliable estimate of the channel quality (the reward $\hat{x}_{i,l}(t)$).

The AP communicates the corresponding learned values to each receiver. In the header of each packet it appends $(\hat{x}_{i,l}(t), \hat{n}_{i,l}(t))$ for one channel i and one rate 1. It uses the LRU (last-recently updated) policy to send the updates: it appends to the packet the information about the (channel, rate) pair that has not been communicated for the longest time. The channel coherence time is generally of order of thousands of packets, so all receivers can obtain timely and accurate learning information.

In addition, all receivers listen promiscuously and learn channel information from overheard packets. Hence the receivers can learn about the channel whenever the AP sends a packet, regardless of the destination receivers of the packet. This is useful when the number of receivers gets large. In contrast, the AP only learns about the channel quality to a certain receiver when it sends a packet to that receiver. Each receiver stores a record $(o_{i,l}, \hat{x}_{i,l}, \hat{n}_{i,l})$ for each channel i and rate l, where $o_{i,l}$ is the number of overheard packets and $\hat{x}_{i,l}$ and $\hat{n}_{i,l}$ are the discounted weights and number of samples, respectively. For each overheard packet at channel i, rate r, the receiver increases $o_{i,l}$ and updates $\hat{x}_{i,l}$ and $\hat{n}_{i,l}$ as described above.

Note that it is much more likely that the packet payload gets corrupted, rather than the packet header. Hence, for most of the packets, successful or not, the receiver can extract the header information correctly and update the corresponding record. If this is not possible, the packet can be simply ignored. Whenever the receiver sends an acknowledgment for a correctly received packet, it appends one of the records $(o_{i,l}^R, \hat{x}_{i,l}^R, \hat{n}_{i,l}^R)$ using the LRU policy, and erases the record by setting all variables to zero. When the AP receives this update, it updates its own records using a cumulative discount:

$$\hat{n}_{i,l}(t+1) = \gamma^{o_{i,l}^R} \hat{n}_{i,l}(t) + \hat{n}_{i,l}^R \text{ and } \hat{x}_{i,i}(t+1) = \gamma^{o_{i,j}^R} \hat{x}_{i,l}(t) + \hat{x}_{i,l}^R$$

Note that this has the same effect as if the AP had received all the packet information itself, and performed the updates. The scheme can then operate in the same manner as described above.

Figure 4:
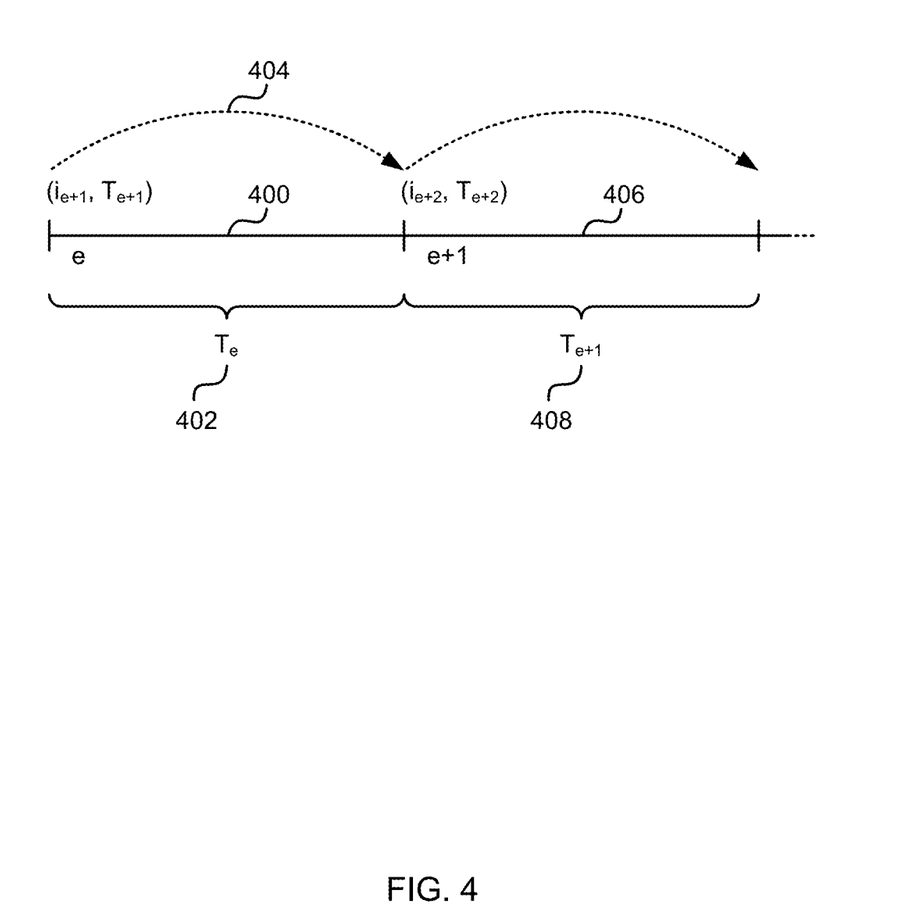
FIG. 4 illustrates a synchronization epoch.

In order to handle synchronization issues, the selection scheme can be arranged to operate in "epochs" as outlined with reference to FIG. 4. An epoch e 400 is a predetermined time period during which all the network nodes are synchronized to a single channel. The AP sets the epoch channel $i_e$ and the epoch duration $T_e$ 402, and the receivers follow. In one example, at the beginning of epoch e 400 the transmitter decides the channel $i_{e+1}$ and epoch duration $T_{e+1}$ which is used in the following epoch e+1. It selects the channel using scheme described above. During the epoch e, tuple $(i_{e+1}; T_{e-1})$ is encoded in the packet header of the packets transmitted 404 in the network to notify the receivers. Thus the AP makes the decision ahead of time, to ensure it is successfully communicated to the receivers before the change takes place after expiry of the epoch, as illustrated FIG. 4, which shows $(i_{e+1}; T_{e+1})$ being transmitted 404 before the change in epoch e+1 406, which has duration $T_{e+1}$ 408 as communicated in advance.

In some examples, the epoch duration is 10 packet transmissions. Since $(i_{e+1}; T_{e+1})$ is common for all receivers in the network, it is enough for a receiver to overhear at least one of these packets (even not destined to itself), to keep synchronization. It can still happen that a receiver misses all the packets and loses synchronization. In this case re-synchronization is used. When re-synchronizing, a receiver moves to the channel i* with the highest weight, $i^*=\arg\max_i \max_j \hat{w}_{i,j}(t)$. When the AP has a packet to send to the receiver, it is likely to send it on the channel with the highest weight. Furthermore, the weight estimates are the same at the AP and the receiver, as they are regularly updated. In one example, resynchronization lasts two epochs.

If re-synchronization fails as well, the receiver can resort to a timeout. During a timeout, a receiver starts searching over all channels. In one example, it remains on a single frequency for two packet durations. If no packet is detected, it skips to the next frequency. The timeout procedure is more expensive, but most efficient when no other hints are available.

Note that no signaling packets are used to maintain synchronization. Signaling packets are only used if the AP has no traffic to send, in which case it can periodically broadcasts keep-alive packets to maintain synchronization.

In a practical system, the synchronization information is appended to the packet header, and hence encoded with the lowest rate and more likely to be received than the rest of the packet. As mentioned above, when the MAC scheme pre-selects the channel $i_e$ for the whole duration of the epoch e the scheduling rules described hereinbefore can be modified to account for this change. Before every transmission, the destination receiver u* is selected with the highest weighting factor given the channel $i_e$. In other words, $u^*=\arg\max_u \max_j \hat{w}_{u,j,i}(t)$, where the weighting factors are defined as above.

In examples, only the destinations that have packets to send (with non-empty queues) are considered. If the AP queues are fully loaded, during a single epoch e only the receiver whose channel quality is good during that time is served, hence maximizing the efficiency. If not, then occasionally a receiver on a suboptimal channel is served. However, serving suboptimally when not all queues are full is a transient event and hence relatively insignificant.

Figure 5:
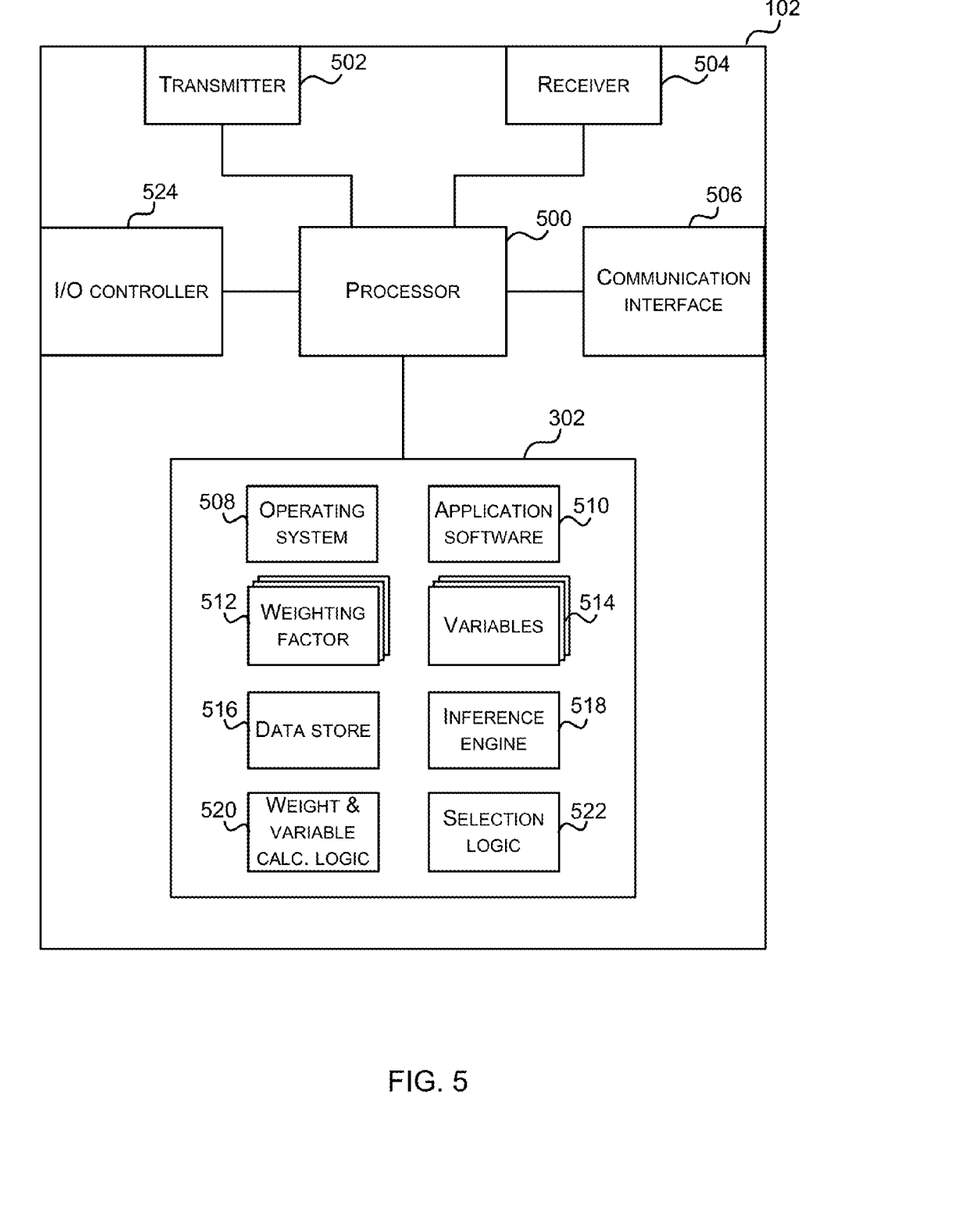
FIG. 5 illustrates an exemplary computing-based device in which embodiments of the dynamic channel and rate selection may be implemented.

FIG. 5 illustrates various components of an exemplary communication device 102 (such as an access point) which can be implemented as any form of a computing and/or electronic device, and in which embodiments of the selection techniques outlined above can be implemented.

Communication device 102 comprises one or more processors 500 which may be microprocessors, controllers or any other suitable type of processors for processing computing executable instructions to control the operation of the device in order to implement the selection techniques and control other functional elements of the communication device 102.

The communication device 102 also comprises a transmitter 502 arranged to transmit data to one or more receivers over a communication network. The transmitter 502 can be arranged to transmit data either via a wireless (radio) signal or via a wired network. The transmitter 502 can transmit data at a plurality of transmission rates (e.g. using different modulation and/or coding schemes) on a plurality of channels (e.g. different frequency channels). The communication device 102 also comprises a receiver 504 arranged to receive data from other nodes in the communication network. The transmitter 502 and receiver 504 are controlled by the processors 500.

The communication device 102 also optionally comprises a communication interface 506, which can be arranged to communicate with one or more additional networks. For example, the communication interface 506 can connect the communication device 102 to a wired network (such as the internet), and the transmitter 502 and receiver 504 provide a wireless local area network enabling local nodes to communicate with the wired network via the communication device 102.

Computer-executable instructions and data storage can be provided using any computer-readable media that is accessible by communication device 102. Computer-readable media may include, for example, computer storage media such as memory 302 and communications media. Computer storage media, such as memory 302, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 302) is shown within the communication device 102 it will be appreciated that the storage may be distributed or located remotely and accessed via, a network or other communication link (e.g. using communication interface 506).

Platform software comprising an operating system 508 or any other suitable platform software may be provided at the memory 302 of the communication device 102 to enable application software 510 to be executed on the device. The memory 302 can store the weighting factor 512 for each combination of receiver, channel and rate as described above. In addition, the memory 302 can store the variables 514 for each combination of receiver, channel and rate as described above. The memory 302 can also provide a data store 516, which can be used to provide storage for any other data. Other software that can be provided on the memory 302 includes: an inference engine 518 arranged to infer performance at other rates (as outlined in detail above); weighting factor and variable calculation logic 520 arranged to maintain and update the values of the variables 514 and weighting factors 512 as described in detail above; and selection logic 522 arranged to perform the selection of receiver, channel and rate as described hereinbefore.

The communication device 102 can optionally also comprise an input/output controller 524 arranged to output display information to a display device which may be separate from or integral to the communication device 102. The display information may provide a graphical user interface. The input/output controller 524 can also be arranged to receive and process input from one or more devices, such as a user input device (e.g. a mouse or a keyboard). In an example the display device may also act as the user input device if it is a touch sensitive display device. The input/output controller 524 may also output data to devices other than the display device, e.g. a locally connected printing or storage device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously, This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer for computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to an item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer storage medium, the computer storage medium being hardware, storing computer-readable instructions which when executed cause one or more processors to perform actions comprising:
    selecting a communication resource for transmitting data from a transmitter to a receiver from a set of communication resources comprising a plurality of channels, each channel having an associated plurality of transmission rates, the action of selecting including:
        storing, in a memory, a weighting factor for each combination of channel and transmission rate in the set of communication resources;
        monitoring performance of a first data transmission on a selected channel at a first transmission rate;
        generating, using one or more processors, an inferred performance for other transmission rates on the selected channel from the performance of the first transmission rate;
        updating each weighting factor in accordance with the performance on the selected channel at the first transmission rate and the inferred performance for the other transmission rates on the selected channel; and
        selecting a channel and transmission rate combination for subsequent data transmission in dependence on the weighting factors.

2. The computer storage medium according to claim 1, wherein each weighting factor comprises a channel exploration factor arranged to decrease when the channel associated with the respective weighting factor is used for data transmission and increase when the channel is not used for data transmission, such that a previously unused channel is more likely to be selected.

3. The computer storage medium according to claim 1, wherein each weighting factor comprises a quality factor for the channel and transmission rate associated with the respective weighting factor.

4. The computer storage medium according to claim 3, wherein the quality factor is based on a weighted average of throughput or goodput values, wherein the weighted average applies a higher weighting to more recent throughput or goodput values.

5. The computer storage medium according to claim 1, wherein each weighting factor comprises a channel switching cost factor arranged to increase the weighting factor when the channel associated with the respective weighting factor matches the selected channel used for the first data transmission.

6. The computer storage medium according to claim 5, wherein the channel switching cost factor is arranged to tend towards zero as the number of times a channel is successively selected increases, such that when a channel has been successively selected for a predefined period of time, the switching cost factor does not affect the weighting factor.

7. The computer storage medium according to claim 1, wherein monitoring performance of a first data transmission on a selected channel at a first transmission rate comprises recording the number of bits of the first data transmission successfully received at the receiver.

8. The computer storage medium according to claim 1, wherein if the performance of the first data transmission indicates that the transmission was successful, then generating an inferred performance comprises inferring that the transmission would also be successful at each of the other transmission rates that are less than the first transmission rate, and wherein if the performance of the first data transmission indicates that the transmission was unsuccessful, then generating an inferred performance comprises inferring that the transmission would also be unsuccessful at each of the other transmission rates that are greater than the first transmission rate.

9. The computer storage medium according to claim 1, wherein generating an inferred performance for other transmission rates on the selected channel from the performance of the first transmission rate comprises:

randomly generating an inferred performance for each of the other transmission rates using a first probability distribution if the first data transmission indicates that the transmission was successful; and randomly generating an inferred performance for each of the other transmission rates using a second probability distribution if the first data transmission indicates that the transmission was unsuccessful, wherein the first and second probability distributions are based on a relative transmission success rate between a respective one of the other transmission rates and the first transmission rate.

10. The computer storage medium according to claim 9, wherein generating an inferred performance for other transmission rates on the selected channel from the performance of the first transmission rate further comprises:

generating a quality value for each inferred performance based on the relative transmission success rate between the respective one of the other transmission rates and the first transmission rate.

11. The computer storage medium according to claim 1, wherein selecting a channel and transmission rate combination for subsequent data transmission comprises selecting the channel and transmission rate combination having the highest weighting factor.

12. A computer storage medium, the computer storage medium being hardware, storing computer-readable instructions which when executed cause one or more processors to:

transmit data to at least one of a plurality of receivers using a selected one of a plurality channels, each channel having an associated plurality of transmission rates;

store a weighting factor associated with each combination of receiver, channel and transmission rate;

transmit a first data packet to one of the receivers using one of the channels and one of the transmission rates;

monitor the first data packet performance;

update each of the weighting factors in the memory in accordance with the first data packet performance; and select one of the receivers, one of the channels and one of the transmission rates for transmission of a subsequent data packet in dependence on the weighting factors.

13. The computer storage medium according to claim 12, wherein each weighting factor comprises a utilization factor based on previous throughput values achieved for the respective receiver.

14. The computer storage medium according to claim 13, wherein the utilization factor is a function of a weighted average of previous throughput values achieved for the respective receiver, wherein the weighted average applies a higher weighting to more recent throughput values.

15. The computer storage medium according to claim 12, wherein each weighting factor comprises at least one of:

a channel exploration factor arranged to decrease when the channel associated with the respective weighting factor is used for data transmission and increase when the channel is not used for data transmission, such that a previously unused channel is more likely to be selected;

an estimated throughput for the channel and transmission rate associated with the respective weighting factor; and a channel switching cost factor arranged to increase the weighting factor when the channel associated with the respective weighting factor matches the channel used to transmit the first data packet.

16. The computer storage medium according to claim 12, the computer-readable instructions, when executed, further causing the one or more processors to monitor the first data packet performance by recording the number of bits of the first data packet received successfully at each of the plurality of receivers.

17. The computer storage medium according to claim 12, the computer-readable instructions, when executed, further causing the one or more processors to select one of the receivers, one of the channels and one of the transmission rates for transmission of a subsequent data packet after expiry of a predetermined time period since transmission of the first data packet.

18. The computer storage medium according to claim 17, the computer-readable instructions, when executed, further causing the one or more processors to notify the plurality of receivers of the selected one of the receivers, one of the channels and one of the transmission rates for transmission of a subsequent data packet using data packets transmitted prior to the expiry of the predetermined time period.

19. The computer storage medium according to claim 12, wherein the weighting factor is calculated using a gradient algorithm arranged to maximize a long-term service rate for the plurality of receivers.

20. A computer storage medium, the computer storage medium being hardware, storing computer-readable instructions which when executed cause one or more processors to schedule a data transmission to a selected receiver over a wireless network comprising a plurality of receivers, each arranged to receive data using one of a plurality of frequency channels, and each frequency channel having an associated plurality of transmission rates by:

storing, in a memory, weighting factors for each combination of receiver, frequency channel and transmission rate;

transmitting a first data packet to one of the receivers over the wireless network using a selected frequency channel and a first transmission rate;

determining a first data packet performance value using the number of bits successfully transmitted in the first data packet at the first transmission rate;

generating, using a processor, an inferred performance value for other transmission rates on the selected frequency channel from the first data packet performance value at the first transmission rate;

updating each of the weighting factors in the memory in accordance with the performance value on the selected frequency channel at the first transmission rate and the inferred performed value for the other transmission rates on the selected frequency channel; and selecting one of the receivers, one of the frequency channels and one of the transmission rates for transmission of a subsequent data packet in dependence on the weighting factors.

* * * * *